Patented Feb. 13, 1940

2,190,600

UNITED STATES PATENT OFFICE 2,190,600

SECONDARY MIXED ALIPHATIC-CYCLIC ALCOHOLS

Josef Kaupp, Bernhard Ritzenthaler, and Curt Schuster, Ludwigshafen-on-the-Rhine, and Hans Hoyer, Leverkusen-I. G. Werk, Germany, assignors to I. G. Farbenindustrie Aktiengesellschaft, Frankfort-on-the-Main, Germany No Drawing. Application June 16, 1937, Serial No. 148,504. In Germany June 19, 1936

6 Claims. (Cl. 260—345)

The present invention relates to new secondary mixed aliphatic-cyclic alcohols.

We have found that valuable secondary mixed aliphatic-cyclic alcohols are obtained by treating ketones containing at least two rings in the molecule and in which the carbonyl group is not directly connected with a ring with hydrogen in the presence of hydrogenation catalysts.

Ketones of the said kind are for example those unsaturated ketones which are formed by reacting aliphatic ketones containing reactive alkyl groups twice with aromatic aldehydes, as for example dibenzylidene acetone, dianisylidene acetone, dicinnamylidene acetone and dinaphthylidene acetone. If such ketones be subjected to hydrogenation, secondary alcohols are obtained in which the aromatic rings have been converted into cycloaliphatic rings, the olefinic double linkages have been converted into saturated carbon linkages and the carbonyl groups into secondary alcoholic groups. The same compounds are obtained when analogous saturated ketones are used instead of the unsaturated ketones.

As initial materials there may also be mentioned those unsaturated ketones which are formed by multiple reaction of cycloaliphatic ketones with aliphatic ketones containing reactive alkyl groups. Among these may be mentioned dicyclohexylidene acetone. By the hydrogenation of these ketones, secondary mixed aliphatic-cycloaliphatic alcohols are also formed by the hydrogenation of the carbon double linkage and the reduction of the carbonyl groups.

Other suitable initial materials for the process according to this invention are those ketones which are formed by the reaction of heterocyclic aldehydes and aliphatic ketones containing reactive alkyl groups, as for example bis-(furfurylidene)-acetone. In this case secondary alcohols are also obtained by hydrogenation of the aliphatic carbon double linkage and of the heterocyclic rings and the reduction of the carbonyl groups.

The hydrogenation is carried out by treating the ketone serving as initial materials, preferably dissolved in a solvent, after the addition of a hydrogenation catalyst, as for example a nickel catalyst or a nickel-chromium catalyst, which may be distributed on a carrier, with hydrogen in a suitable vessel, as for example in a rotary or stirring pressure vessel. Alcohols are especially suitable as solvents.

The hydrogenation is preferably carried out at temperatures of from about 100° to about 250° C., because otherwise the speed of reaction becomes too low and the hydrogenation does not proceed completely. The pressure of hydrogen employed may be as desired; it is preferable to work under increased pressure, for example above 20 atmospheres, preferably at pressures between 100 and 200 atmospheres.

In many cases it is favourable to carry out the hydrogenation in stages first effecting the addition of hydrogen to the olefinic double linkages at low temperatures and then to bring about the hydrogenation of the ketonic groups and the aromatic or heterocyclic rings by raising the temperature. Care must be taken that, on the one hand, no splitting off of the carbonyl or alcohol oxygen atoms in the form of water takes place, because otherwise hydrocarbons would be obtained and not alcohols, and that on the other hand the hydrogenation is carried out with sufficient vigour also to hydrogenate the cyclic ring thoroughly.

The recovery of the secondary alcohols from the reaction mixture is usually very simple; it may be effected, after the absorption of the necessary amount of hydrogen, by freeing the product from catalyst and then distilling off any solvent present. The secondary alcohols may be purified if desired by recrystallization or distillation.

The alcohols obtainable according to this invention are of industrial value for example as perfumes, softening agents and additions to wax preparations of a great variety of kinds. The alcohols may also be employed with special advantage for the preparation of assistants for the textile and related industries; such assistants may be obtained therefrom by the introduction of solubilizing groups, for example by reacting the alcohols with alkylene oxides or sulphonating agents such as chlorosulphonic acid.

The following examples will further illustrate the nature of this invention but the invention is not restricted to these examples. The parts are by weight.

Example 1

100 parts of dibenzylidene acetone are dissolved in 400 parts of methanol and to this solution there are added 5 parts of a nickel-chromium catalyst. (The catalyst may be prepared for example as follows: 2000 parts of nickel carbonate are made into a paste with water, well mixed with a solution of 50 parts of chromic acid and dried. The mixture is heated first in a current of nitrogen at 300° C. and then in a current of hydrogen at 350° C.). The initial mixture is treated in a stirring pressure-tight vessel with hydrogen under a pressure of 200 atmospheres first at ordinary temperature and then at 160° C. until hydrogen is no longer absorbed. The catalyst is separated and the methanol evaporated; there is obtained as a residue di-(cyclohexylethyl)-carbinol in the form of a colorless oil which solidifies after some time to paraffin-like crystals; it is in practically pure form. It is obtained in an entirely pure state by distillation, the yield being over 90 per cent. It boils at from 145° to 148° C. at a pressure of from 0.3 to 0.4 millimetre (mercury gauge) and has a melting point of from 65° to 66° C.

In the same way di-(cyclohexyl-butyl)-carbinol having a boiling point of from 200° to 210° C. at a pressure of from 0.6 to 0.8 millimetre (mercury gauge) is obtained from dicinnamylidene acetone.

*Example 2*

5 parts of a nickel catalyst (prepared by precipitating nickel hydroxide on silica gel and reduction in a current of hydrogen at from 400° to 600° C.) are added to a solution of 100 parts of bis-(dimethylaminobenzylidene)-acetone in 500 parts of ethyl alcohol. The mixture is treated in a pressure-tight vessel with hydrogen under a pressure of 200 atmospheres at from 160° to 170° C. When the absorption of hydrogen has ceased, the catalyst is separated off and the reaction mixture distilled under reduced pressure. There is thus obtained in practically the calculated yield bis-(dimethylaminocyclohexylethyl)-carbinol as a colorless oil having an odor similar to amines and boiling at from 217° to 220° C. under a pressure of from 1.5 to 2 millimetres (mercury gauge).

Di-(methoxy-cyclohexylethyl)-carbinol having a boiling point of from 167° to 170° C. under a pressure of from 0.5 to 0.6 millimetre (mercury gauge) is obtained in the same way from dianisylidene acetone.

*Example 3*

5 parts of a nickel-chromium catalyst as specified in Example 1 are added to a solution of 100 parts of difurfurylidene acetone in 300 parts of ethyl alcohol. The mixture is treated in a pressure-tight vessel with hydrogen under a pressure of 200 atmospheres, the temperature being slowly raised to from 140° to 150° C. After the absorption of hydrogen has ceased, the catalyst is separated and the reaction mixture distilled under reduced pressure. The di-(tetrahydrofurrylethyl)-carbinol formed in a very good yield is a colorless oil which boils at from 198° to 200° C. under a pressure of from 17 to 18 millimetres (mercury gauge).

*Example 4*

A solution of 100 parts of dinaphthylidene acetone in 300 parts of methanol is hydrogenated in a pressure-tight vessel in the presence of a nickel catalyst under a pressure of 50 atmospheres the reaction being carried out first at ordinary temperature and then at from 160° to 170° C. After the absorption of hydrogen has ceased, the catalyst is separated off and the reaction mixture is distilled under reduced pressure. A pale yellow colored, viscous oil is thus obtained which boils at from 290° to 300° C. under a pressure of 5 millimetres (mercury gauge).

What we claim is:

1. Secondary mixed aliphatic-cyclic alcohols corresponding to the general formula

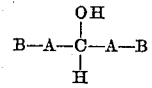

wherein the A's stand for alkylene radicles containing at least two carbon atoms and wherein the B's stand for saturated rings.

2. Secondary mixed aliphatic-cyclic alcohols corresponding to the general formula:

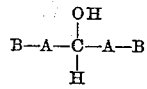

wherein the A's stand for alkylene radicles containing at least two carbon atoms and wherein the B's stand for saturated isocyclic rings.

3. Secondary mixed aliphatic-cyclic alcohols corresponding to the general formula:

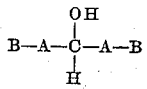

wherein the A's stand for alkylene radicles containing at least two carbon atoms and wherein the B's stand for saturated heterocyclic rings.

4. An alcoholic compound corresponding to the formula

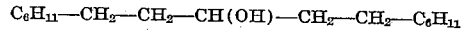

5. An alcoholic compound corresponding to the formula

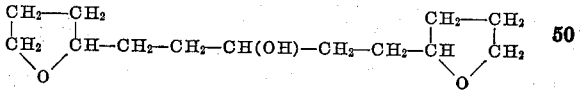

6. An alcoholic compound corresponding to the formula

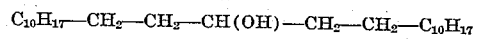

JOSEF KAUPP.
BERNHARD RITZENTHALER.
CURT SCHUSTER.
HANS HOYER.